No. 824,240. PATENTED JUNE 26, 1906.
C. H. GOODMAN.
SUPPLEMENTAL TIRE FOR VEHICLE WHEELS.
APPLICATION FILED MAR. 30, 1906.
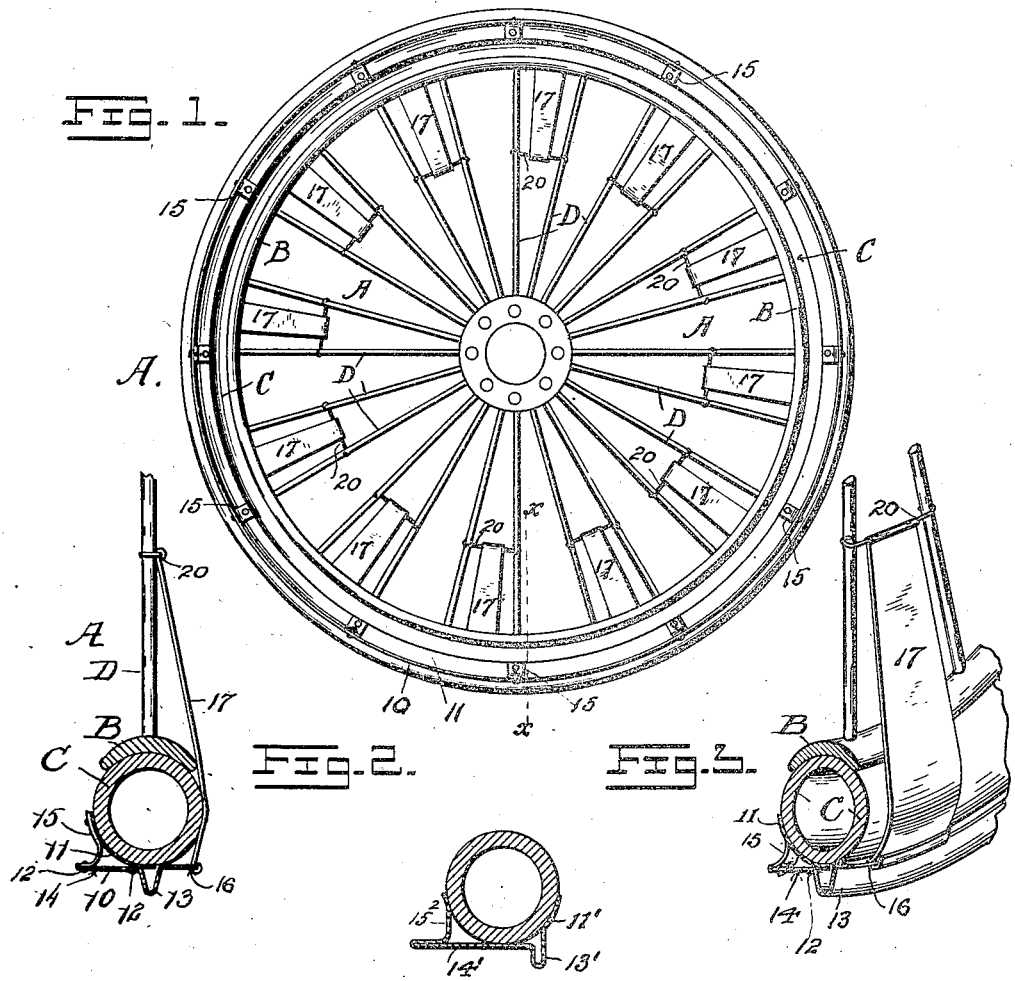
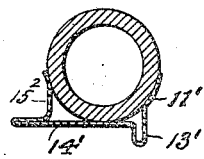
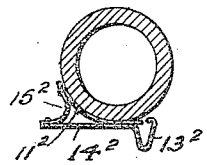
Witnesses
Inventor
Chas. H. Goodman,
By T. Walter Fowler
Attorney

UNITED STATES PATENT OFFICE.

CHARLES H. GOODMAN, OF BUCYRUS, OHIO.

SUPPLEMENTAL TIRE FOR VEHICLE-WHEELS.

No. 824,240.　　　　　Specification of Letters Patent.　　　Patented June 26, 1906.

Application filed March 30, 1906. Serial No. 308,832.

*To all whom it may concern:*

Be it known that I, CHARLES H. GOODMAN, a citizen of the United States, residing at Bucyrus, in the county of Crawford and State of Ohio, have invented new and useful Improvements in Supplemental Tires for Vehicle - Wheels, of which the following is a specification.

My invention relates to certain new and useful improvements in supplemental flanged tires adapted to removably fit over the ordinary tire of the wheel of an automobile or other vehicle, whereby the vehicle is readily converted from the ordinary road-machine to one that is capable of being propelled or otherwise operated over the rails of a steam or other railway; and my invention consists of the parts and the constructions and combinations of parts, which I will hereinafter describe and claim.

The essential object of my invention is to provide a comparatively simple and inexpensive supplemental flanged rim which is preferably made of metal and which is capable of being readily applied to the ordinary pneumatic, cushion, or other tires of a motor-vehicle or the like, whereby the vehicle may be quickly converted into a machine which is capable of fitting and being run over the rails of a railroad-track for the purpose of quick transit in reaching a point on the line where a wreck or accident has occurred and for inspection of the line and such other purposes as a vehicle of this character might be used to advantage.

In the accompanying drawings, forming part of this specification, and in which similar characters of reference indicate like parts in the several views, Figure 1 is a side elevation of a vehicle-wheel with my supplemental rim applied thereto. Fig. 2 is a sectional view of the same on the line *x x* of Fig. 1. Fig. 3 is an enlarged sectional perspective of a portion of the wheel. Figs. 4 and 5 are modifications to be referred to.

As before stated, my invention is to be considered primarily as in the nature of an attachment to the wheels of a motor-vehicle or like wheeled carrier and which is capable of quick application to the wheels of said vehicle when occasion requires or makes desirable the use of the rails of a railroad-track in speedily reaching a certain point or destination and which attachment may be removed from the wheel without in any manner disarranging or impairing any part of the wheel for its ordinary purposes of a road-machine.

The wheel A may be any approved or well-known form—for instance, such as is commonly used on automobiles or motor-vehicles and employing a rim B, of wood or metal, and a rubber tire C of the pneumatic, cushion, or solid type. It will also have the spokes D and such other accessories as are usually found associated with such wheels.

The supplemental rim is preferably made of metal—say sheet-steel or the like—of sufficient thickness to sustain its shape and safely support the weight which it is to carry. This supplemental rim is adapted to fit over the ordinary rubber tire of the wheel, and it may consist, preferably, of two pieces 10 and 11, the former of which forms the flange and tread of the rim, while the latter is curved transversely to form a segmental band adapted to fit the curvature of the tire and having such transverse width that it extends around about one-quarter of the tire and closely fits the same. In the drawings I show the segmental band 11 as engaging the circumference of the tire on its outer side, said band having its outer edge portion riveted to the piece 10 at 12 or otherwise firmly secured to said piece.

The piece 10 is made substantially as a flat band, and it encircles the circumference of the tire and the outer edge of the band 10 and has its central portion provided with a flange 13, which may be made by folding the plate 10 along substantially its longitudinal central line. The straight portion of the band 10 at the side of the flange on which the curved band 11 is substantially located forms a tread 14, which is adapted to engage and travel on the top surface of the railroad-rail, while the flange travels against the side of the head of the rail in the usual manner to retain the wheel on the rail. The outer edge of the plate 10 on the "tread" side is connected to the segmental band 11 by means of suitable braces 15, riveted to both parts and spaced at suitable distances around the rim. The other transversely - extending straight portion of the band 10 is located, preferably, on the inner side of the wheel, and it has formed in it at suitable distances apart the slots 16, which are engaged by the outer ends of the clamp members 17, the connection being in the form of a hinge-joint by reason of the outer end of the clamp member being passed through the slot and then curled or bent over the edge of the band 10. The clamp member being thus hingedly connected to the band 10 may be "opened" and "closed," so to speak, to permit the ready attachment of the supplemental rim, to be removed when its further immediate use is unnecessary. When closed, as when the attachment is in place on the wheel, the clamp member extends inward over the inner side of the tire C and its inner rim B and along the spokes a suitable distance, and its inner end is attached to the spokes in some appropriate manner, as by turning over the inner end to an eye or bearing in which is mounted, slidably or otherwise, a transversely-extending rod 20, capable of extending between adjacent spokes and having its ends curved or bent and adapted to hook behind the spokes, as shown. It is of course not essential that the locking-rod be slidable or, in fact, that it be a bar, as any well-known means may be employed to secure the inner end of the clamp member without departing from the spirit of my invention.

To attach the supplemental band, as when it is desired to convert the machine from a road-machine to one that will engage and travel on the rails of a railroad-track—for instance, when an accident or disaster has occurred at some distant point and it is the desire of the officials or authorities, surgeons, &c., to reach the scene with despatch—the band 10 is slipped over the ordinary tire of the wheel until the segmental band 11 fits closely against the outer side of said tire. Then the clamp members are closed inwardly over the outer side of the tire and rim to draw the segmental band on the opposite side into close frictional engagement with said tire, and the inner ends of the clamp members are secured to the spokes or otherwise to secure the members and to hold them and the other parts in a secure condition. The machine may now be placed on the rails of the railroad and speeeded to its destination with safety and despatch.

In the foregoing description I have disclosed a preferred form of my invention; but I do not limit myself thereto, as reasonable modifications may be made therein without departing from the spirit or sacrificing any of the advantages thereof. For instance, in Fig. 4 I show a supplemental tire formed from a rolled strip having the flange 13', the tread 14', and a curved portion 11', which substantially corresponds to the curved band 11 of Figs. 1, 2, and 3, and in Fig. 5 I show another form, wherein the strip is rolled to form the flange $13^2$, the tread $14^2$, and a curved member $11^2$, embracing a portion of the circumference of the permanent tire. Both of these forms are suitably braced, as at $15^2$, and any method may be employed to hold them in place. The forms shown in Figs. 4 and 5 are made substantially of one piece of sheet-steel or like material rolled into the form shown.

Having thus described my invention, what I claim as new, and desire to secure by Letters Patent, is—

1. The combination with a wheel having a permanent tire, of a supplemental tire removably fitting the permanent tire and comprising two bands one curved transversely to fit the curvature of the permanent tire at one side of the vertical center thereof, and the other having a centrally-located flange and oppositely-extending sides, means connecting the curved band with the other band at one side of the flange portion of the latter, and clamp members hinged to the other side of said band and extending inward and attachable to a fixed part of the wheel.

2. The combination with a wheel having a permanent tire, of a supplemental flanged tire removably fitting the permanent tire said flanged tire comprising a band fitting over the permanent tire and having a flange and a tread portion at one side thereof, said flange and tread portion adapted to fit a railroad-rail, a curved band fixed to the first-named band and adapted to fit substantially a side portion of the permanent tire at one side of the vertical center thereof, braces connecting the curved band with the tread portion of the other band, and movable clamp members at the opposite side of the vertical center of the tire adapted to detachably connect that side of the band with a fixed part of the wheel whereby the supplemental tire is removably retained in place on the permanent tire.

3. A supplemental tire attachable to the permanent tire of a wheel and comprising a metallic band adapted to circumscribe the tire said band having a projecting flange and a tread portion transverse thereto, and having a rigid curved member adapted to fit substantially a side portion of the permanent tire, and hinged clamp members connecting with the side of the flanged band opposite to the curved band and adapted to detachably hold the supplemental tire in place on the permanent tire.

4. A supplemental tire attachable to the permanent tire of a wheel and comprising a metallic band adapted to circumscribe the tire said band having a projecting flange and a tread portion transverse thereto, and having a rigid curved member adapted to fit substantially a side portion of the permanent tire, and means connecting with the side of the flanged band opposite to the curved band and adapted to detachably hold the supplemental tire in place on the permanent tire, said means comprising clamp members having their outer ends hingedly connected to the band, and means at the inner ends of the members adapted to detachably connect the same to the spokes of the wheel.

In testimony whereof I have hereunto set my hand in presence of two subscribing witnesses.

CHARLES H. GOODMAN.

Witnesses:
W. L. MONNETT,
H. T. KEMMIS.